May 9, 1933. W. B. PROUTY 1,908,181
DUST COLLECTOR AND SEPARATOR SYSTEM
Filed June 8, 1928 2 Sheets-Sheet 2
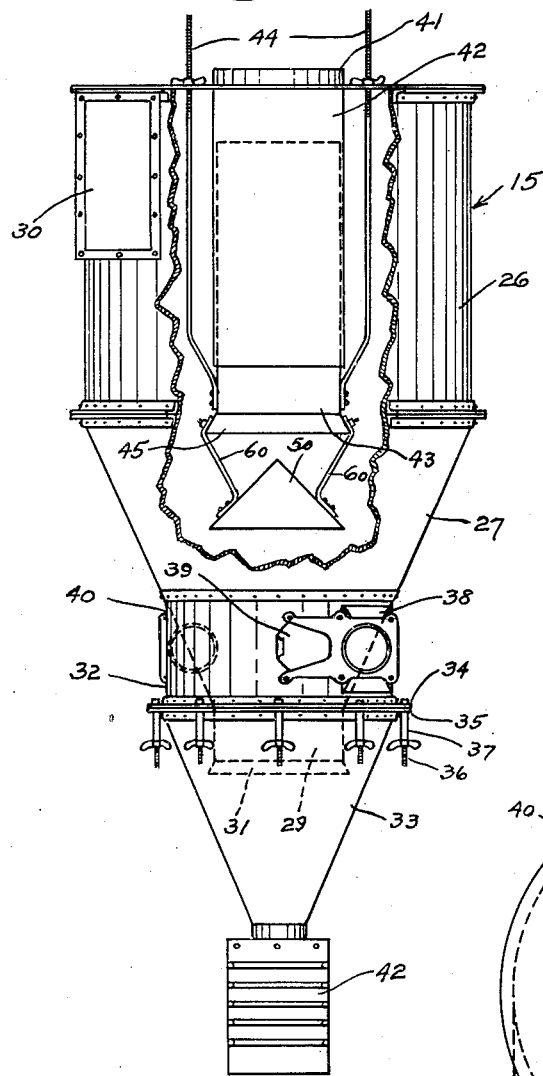
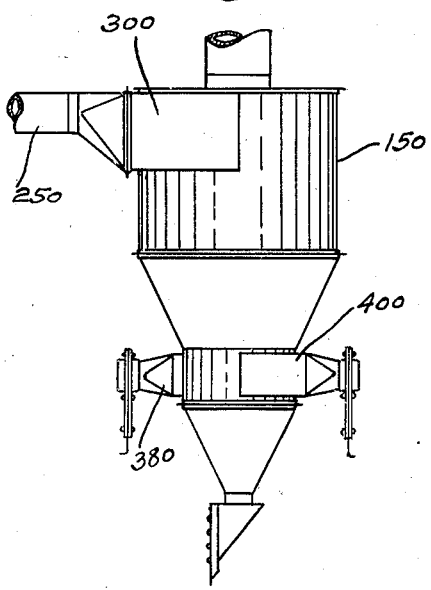
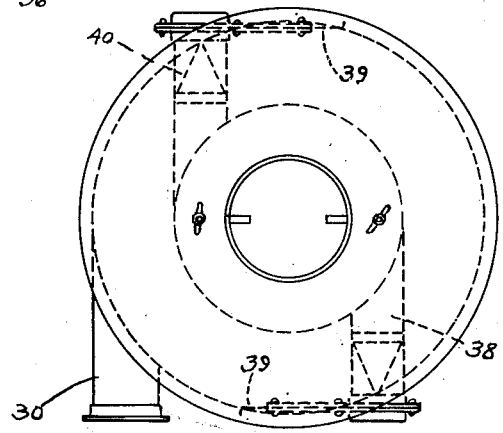
William B. Prouty
Inventor
By Gillson, Manus&Cox
Attorneys Patented May 9, 1933

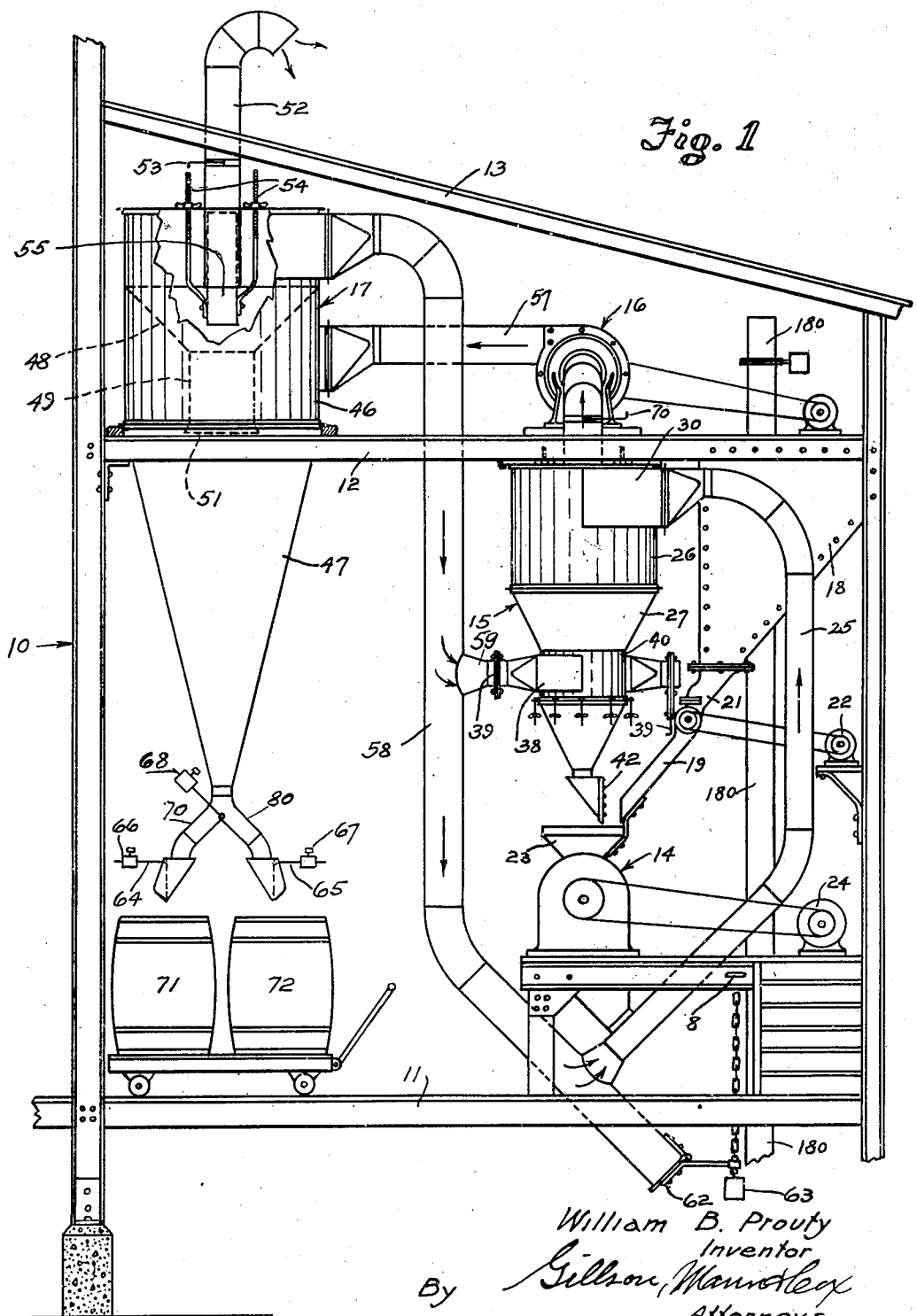

1,908,181

UNITED STATES PATENT OFFICE

WILLIAM B. PROUTY, OF EVANSTON, ILLINOIS

DUST COLLECTOR AND SEPARATOR SYSTEM

Application filed June 8, 1928. Serial No. 283,771.

This invention relates to systems for grinding or pulverizing material, separating and collecting the finer granules, and returning the coarser particles to the mill to be reground.

One of the objects of the invention is the provision of a new and improved system for separating and collecting ground material with a minimum amount of waste and with new and improved means for regulating and controlling the separating and collecting of the ground material.

Another object of the invention is the provision of a new and improved dust separator and collector mechanism arranged in the form of a closed system whereby an exceedingly small amount of air escapes from the system during its operation, thereby reducing the loss of fines escaping with the air to a minimum.

A further object of the invention is the provision of a dust separating and collecting system in which the operation of the system is controlled largely by the admission of air into the separator in a direction opposite to the current of air which conveys the ground material to the separator.

Another object of the invention is the provision of a new and improved dust separator having a novel arrangement of means for causing the separation of ground material from the material laden air introduced into said separator.

A still further object of the invention is the provision of a new and improved system of dust separation and collection that is cheap to manufacture, easily installed, composed of few parts, that is efficient in operation and sensitive in its control.

Other and further objects and advantages of the invention will appear from the following description taken in connection with the accompanying drawings, in which Fig. 1 is a side elevation of the device installed and shown more or less diagrammatically, with parts broken away and parts removed for the sake of clearness;

Fig. 2 is an elevation of the separator with parts broken away;

Fig. 3 is a plan view thereof; and

Fig. 4 is a view similar to Fig. 2 on a smaller scale, showing a slightly modified form of construction.

Referring now to the drawings, the reference character 10 designates generally the building within which the system is installed, which comprises the lower floor or support 11 and the upper floor or support 12. The roof is shown at 13.

The dust separator and collector system comprises a mill 14, a separator 15, a fan 16 and a collector 17, all connected by suitable conduits to form what for convenience of description will be termed a closed circuit system. Air is caused to circulate through the system in the direction of the arrows, see Fig. 1, as will presently appear.

The mill 14 is adapted to reduce the material which may be introduced into the mill, in any suitable manner. As shown, the mill is supplied with material from a hopper 18 which in turn is supplied by an elevator 180 of any preferred construction. From the hopper, the material is discharged into a chute 19 by a conventional feeding mechanism 21 operated by the motor 22. The material passes from the chute 19 into the mill hopper 23 and from thence into the mill 14 in the usual manner. The mill 14 is operated by any approved means, as by the motor 24.

An elevator conduit 25 extends from the lower portion of the mill 14 to the dust separator 15. The ground material flows by gravity and the suction of the air from the mill into the elevator conduit 25 and from thence it is carried by the air current upward through the conduit 25 into the separator 15 through the tangential inlet 30.

As shown, the separator comprises the upper cylindrical portion 26 and a lower tapered portion 27, see Figs. 2, 3 and 4, which terminates in a cylindrical portion 29 having a short flaring flange 31 on its lower portion.

In order that the separator shall function to separate the coarser from the finer ground material, it is necessary to introduce air into the lower portion of the separator. Suitable means are provided for this purpose. In the form of construction selected to illustrate one embodiment of the invention, a supplemental casing 40 is employed. This casing comprises a cylindrical drum 32 secured to the conical portion 27 of the separator above the lower end thereof, and a conical discharge member 33 is adjustably connected to said drum. As shown, the drum is provided on its lower portion with an annular flange 34 above the lower end of the cylindrical portion 29, and the upper end of the conical discharge member is provided with a corresponding flange 35. These flanges are adjustably connected together by the bolts 36 having the sleeves 37 thereon. By loosening the nuts on the bolts 36 an annular space may be provided between the flanges for introducing air into the system.

It has been found by experiment that the apparatus is more sensitive to adjustment and better results may be obtained if the air be introduced tangentially into the space about the lower end of the conical portion 27. Preferably one or more tangential inlets are provided which are attached to the drum 32. As shown, two inlets 38 and 40 are employed. A gate or valve 39 is employed for each inlet for controlling the supply of air to the interior of the drum 32 through said inlets. The inlets 38 and 40 are reversed relative to the inlet 30.

The air delivered into the separator 15 through the inlet 30 will be caused to rotate with the hands of a clock when viewed from above, and the heavier particles of ground material will be thrown outward against the walls of the separator by centrifugal force, and will fall along said walls by gravity and be discharged through the lower end of the separator into the auxiliary casing. The lighter particles are carried through the discharge conduit 41 into the fan 16.

The air introduced through the tangential inlets 38 and 40 will be rotating in the opposite direction from the air entering through the inlet 30 and will pass upward through the cylindrical portion 29 and be exhausted through the discharge conduit or drum 41.

The heavier ground material will be discharged through the valve 42 into any suitable receptacle as the mill hopper 23.

In practice, little or no air is admitted between the flanges 34 and 35; this arrangement is only necessary where, for any reason, the capacity of the valve inlets 38 and 40 are not sufficient to supply the necessary air to the system to make it operate at its highest efficiency.

The discharge conduit or drum 41 is preferably, though not necessarily, telescopic, the outer portion 42 being fixed to the separator casing. The inner section 43 is raised and lowered for adjustment by the rods 44.

The lower end of the inner tubular section 43 is preferably though not necessarily provided with a flaring portion or flange 45.

When the conduit or drum section 43 is lowered, a greater amount of the ground material will pass upwardly through the conduit or drum 41 into the fan and a less amount when the section 43 is elevated.

It has been found by experiment that if a baffle be suspended beneath the telescopic section 43, the result will be a less amount of the ground material entering the separator will pass through the drum or conduit 42 than without it. The baffle 50 may be suspended beneath the telescopic section 43 and is preferably detachably connected thereto whereby it may be employed, if desired, to modify the operation of the separator. In the form shown, it is cone shaped and is suspended by a plurality of arms 60 detachably connected to the conduit section 43 by suitable bolts.

From the separator, the dust laden air passes through the fan and is delivered into a dust collector 17. The expression dust laden air is used for convenience in the description and claims to designate air laden with ground material. A blast gate or valve 70 is provided in the conduit between the separator and the fan for controlling the flow of air through said conduit.

The collector comprises an upper cylindrical member or portion 46 and a lower tapered member or portion 47. A conical partition 48 is provided in the upper cylindrical member 46. This partition is provided with a downwardly extending cylindrical member 49 which extends axially of the collector. Its lower end is preferably provided with a flanged portion 51.

A breather pipe 52 extends axially downward into the collector at its lower end and its upper end extends through the roof 13 in the usual manner.

A valve 53 controls the discharge of air through the pipe. The lower end of the pipe 52 may be provided with a telescopic section 55 which is held in adjusted position by the adjusting bolts 54.

The conduit 57 leading from the fan discharges tangentially in one direction into the colletcor below the partition 48, and the conduit 58 leading from the collector back to the mill is arranged tangentially in the opposite direction above the partition, as clearly shown in Fig. 1.

In order that the separator 15 shall function properly, a supply of air must be delivered continuously to the lower portion of the separator. If this air be supplied directly from the room, it will add that much additional air continuously to the system and this will necessitate the continuous escape through the breather pipe of this additional air, thereby carrying away an additional amount of the fines through said pipe. For this reason, suitable means are provided for using the air over and over again, and at the same time supplying the requisite amount of air to the lower portion of the separator. As shown, means are provided for shunting air across from the return conduit 58 through the inlet 38. This means comprises a pipe 59 communicating with the return conduit 58 and attached to the inlet 38. The valve 39 in the inlet 38 controls the amount of air shunted from the return pipe into the separator.

The inlet 40 is shown as opening directly into the room. Its blast gate or valve 39 may be closed, or if desired, an additional shunt conduit may be provided, but this is usually not necessary. While it is preferable to supply air to the lower portion of the separator through the inlet 38 from the return conduit, it is understood that the necessary amount of air may be supplied through the inlet 40 or through both inlets 38 and 40 as desired, depending on the nature of the material that is being operated upon.

The lower portion of the return pipe 58 is in communication with the elevator conduit 25 and its lower end is provided with a discharge valve 62 through which the material collected in the lower portion of the conduit 58 may be discharged from time to time. The valve 62 may also be manually opened by pulling on the flexible member 68, if desired, to permit the discharge of ground material that may tend to collect in the pipes or conduits 25 and 58.

As shown, the valve 62 is normally held in closed position by a weight 63 of such size that the material collecting in the lower end of the pipe 58 will be automatically discharged at intervals from said pipe.

The lower end of the collector 17 is provided with one or more discharge conduits. As shown, two conduits 70 and 80 are employed which are provided with the usual discharge valves 64 and 65, normally held in closed position by suitable weights 66 and 67 adjustably mounted on projecting arms on said valves. A divider 68 is adapted to divert the material into one or the other of the conduits 70 or 80, as is usual in such construction. Suitable receptacles for receiving the material discharged through the valves 64 and 65 are shown at 71 and 72.

Preferably the bends in the air conduits of the system are broad curves in order that the ground material may not be deposited therein. The conduits 25 and 58, for instance, are so constructed that any material collecting therein will slide down the interior thereof and escape through the valve 62 from time to time.

In Fig. 4 is shown a slightly modified form of separator. In this construction, the inlet 300 for the elevator conduit 250 delivers the air into the separator 150 in the opposite direction from that disclosed in Fig. 1, and the inlets 380 and 400 are adapted to deliver air into the lower portion of the separator in a direction opposite to the corresponding inlets 38 and 40 of the separator 15. The direction the air is delivered into the separator, however, is immaterial so long as the air enters the lower portion of the separator in a direction opposite to that entering through the inlet in the upper portion of the separator.

In this form of construction, neither of the inlets 380 or 400 are adapted to be connected to the return conduit. In this device, the air enters directly from the room through either or both of the inlets 380 and 400.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. In a dust separator and collector system, a mill, a separator, a collector, an elevator conduit between said mill and the upper portion of said separator, a fan conduit between said separator and collector, a fan in said conduit, a return conduit between said collector and the lower portion of said elevator conduit for conducting air tangentially from said collector, a discharge valve in the lower portion of said return conduit, and means for introducing air into the lower portion of said separator in counter flow relation to the main current therein.

2. In combination, a mill, a separator, a collector having a cylindrical upper portion and a lower conical portion, said cylindrical portion being divided by a conical wall into an upper chamber and a lower chamber, a conduit for conducting ground material from said mill and delivering the same tangentially into the upper portion of said separator, a fan conduit extending axially into said separator for conducting material from said separator and delivering the same tangentially into said lower chamber, a fan in said last named conduit, a return conduit for receiving air tangentially from said upper chamber in a direction opposite to the fan conduit inlet and delivering the same to said elevator conduit, and a shunt conduit for conducting air from said return conduit and delivering the same tangentially into said separator in a direction opposite to that delivered by said elevator conduit into said separator.

3. A dust separator comprising a cylindrical portion, a lower tapered portion, a tangential inlet for said cylindrical portion, a telescopic drum extending axially into said cylindrical portion, the lower portion of said drum being flanged outwardly, a baffle suspended below said flange, the lower portion of said tapered portion terminating in a flanged drum, a cylindrical member attached to said tapered portion and surrounding said drum, a tangential inlet in said member arranged in the opposite direction from said first named inlet, and a lower tapered member adjustably connected to said cylindrical member.

4. In a system for separating and collecting finely divided materials, in combination a separator, a collector, a conduit connecting the two in series, a return conduit from said collector proceeding to a point at which the pulverized material is introduced into the system and continuing to a tangential inlet in said separator, a shunt conduit located above said point of entrance, connecting said return conduit and the lower portion of said separator for conducting air tangentially into said separator, and means for circulating air through said system.

5. In a system for collecting and separating finely divided materials, in combination, a separator, a collector, a conduit connecting the two in series, a return conduit from said collector proceeding to a point at which the pulverized material is introduced into the system and continuing to a tangential inlet in said separator, a shunt conduit located above said point of entrance for connecting said return conduit and a lower portion of said separator for conducting air into said separator tangentially in a direction opposite to the air introduced by said tangential inlet, means for circulating air through said system, and means exterior to the circulating system receiving material from the rejection gate of said separator for pulverizing the material and introducing it into the circulating system.

6. In a system for separating and collecting pulverulent material, fluid impelling means, a separator, a collector, a conduit between an axial outlet of the separator and a tangential inlet of the collector, a tangential outlet from said collector, a conduit from said outlet to a point at which the pulverulent material is introduced into the system, a conduit from said point to a tangential inlet to said separator, a shunt conduit conducting air from said collector outlet to a tangential inlet in a lower portion of said separator, and means exterior to said fluid circulating system for pulverizing material and introducing it into the circulating system at a point named.

7. A dust separator comprising a casing having a chamber, an inlet for introducing air tangentially into one portion of said chamber, an outlet passage arranged axially of said casing, an intake passage for introducing air tangentially into another portion of said chamber, and means for introducing air radially into the lower portion of said chamber.

8. A dust separator comprising a casing having an upper cylindrical portion and a lower portion of less cross-sectional area than said upper portion and including a tapered portion, a cylindrical casing surrounding a part of said lower portion and in communication with said first-named casing, a discharge conduit, an air discharge member in communication with said conduit and extending axially downward into said cylindrical portion for conducting air from said first-named casing to said discharge conduit, an inlet for introducing air tangentially into said cylindrical portion at a point above the lower end of said member, an intake passage for introducing air tangentially into said second-named casing below said member, and means for introducing air into said lower portion adjacent to said second-named casing.

9. In a dust separator and collector system, a separator comprising an upper portion circular in cross section, a tapered lower portion having an unobstructed opening therein in its lower end, the side wall of said lower portion being imperforate, means extending around and forming a chamber about said lower portion and said opening, a tangential inlet for said upper portion, an inlet for said chamber above the unobstructed opening, and an outlet conduit extending axially into said upper portion.

10. In a dust separator and collector system, a separator comprising an upper portion circular in cross-section, a truncated lower portion having a flange extending about its lower end, means extending around and forming a chamber about said lower portion, a tangential inlet for said upper portion, an inlet for said chamber above said flange for admitting air thereto in a direction counter to that admitted through said tangential inlet, an outlet conduit extending axially into said upper portion, said outlet conduit comprising telescopic sections and means for telescopically adjusting said sections.

11. In a dust separator and collector system, a separator comprising an upper portion circular in cross section, a tapered lower portion having an unobstructed opening in its lower extremity, means extending around and forming a chamber about said lower portion, a tangential inlet for said upper portion, an inlet for said chamber above the unobstructed opening, said last named inlet being adapted to deliver air into said chamber in a direction opposite to that of said first named inlet, and means for controlling the flow of air through the inlet for said chamber.

12. In combination, a mill, a separator, a collector, conduits connecting said mill, separator and collector in an air circulating system, one of said conduits leading tangentially into the upper portion of the separator and another of said conduits extending downwardly into said separator below the first named conduit, a circular baffle supported directly beneath, adjacent to and in spaced relation to the lower end of said last named conduit and extending transversely thereto, a fan for circulating a main current of air through said system, means for admitting air tangentially into a lower portion of said separator in counter-flow relation to the main current, and means for controlling the amount of air admitted to the lower portion of said separator.

13. In combination, a separator having an opening in its lower end and a casing surrounding the lower end and said opening, a collector, conduits connecting said separator and collector in an air circulating system, one of said conduits delivering air tangentially to the upper portion of said separator, means for circulating air through said system, means including a conduit for admitting air from said system tangentially into said casing above the opening in the lower end of the separator in a direction opposite to that of the air introduced into the upper portion of said separator, and means in said conduit for controlling the admission of said air.

14. In a dust separating system, a separator having an axial opening in its lower end, means for introducing dust laden air into one portion of said separator and for causing the same to flow in a circular path in one direction, means for introducing air into said separator through said axial opening in its lower end and means spaced vertically from the axial opening for causing said air to flow in a circular path counter to that of said first named air prior to its passage through the axial opening to cooperate therewith in separating material from said dust laden air.

15. In a dust separating system a separator having an upper cylindrical section and a lower conical section having an outlet in its lower end, a discharge conduit extending into said separator, means for introducing dust laden air into said cylindrical section at a point above the inner end of said conduit and for causing the same to rotate in one direction around the inner end of said conduit, a cylindrical casing surrounding the lower conical section having a tapering section directly connected to its bottom edge and provided with a valved outlet at its lower extremity, and means for introducing air into said cylindrical casing and for causing the same to flow in a direction opposed to said first named means.

16. In a separating and collector system, a separator comprising a casing, inlets and outlets in said casing, means for maintaining a flow of fluid through said casing having entrained particles therein, means for imparting a rotational velocity to said fluid stream within said separator and the entrained particles therein, a return conduit for returning air to said inlet, a second inlet admitting substantially particle free fluid from said return conduit to said casing in a substantially reverse direction to the first named stream for contacting with said streams for assisting in the separating action, and means for separately adjusting the pressure and volume of said second stream whereby the rotational velocity of the fluid supporting the entrained particles may be controlled and the minimum size of particles entrained by the fluid on its exit from said casing is determined.

17. A separator comprising a casing, an inlet to said casing, means for introducing material laden air through said inlet, the location of said inlet with respect to the casing causing the fluid to move in a vortex therein, a second inlet admitting a predetermined quantity of unmixed fluid at a pressure not in excess of atmospheric in generally reverse directions to the main fluid movement, for checking the rotational velocity of a portion of the main body of fluid in a limited zone in said casing, whereby the rotational velocity of the fluids in said casing may be controlled, and the size of particles carried by said fluid streams consequently determined, and a valve in said second inlet exterior of said casing for controlling the amount of air supplied to said casing through said second inlet.

18. A dust separator comprising a casing having a cylindrical upper portion and a tapered lower portion, an air discharge member extending downwardly axially into said cylindrical portion for conducting air from said casing, an inlet for introducing material laden air tangentially into said casing at a point above the lower end of said member, a second cylindrical casing surrounding the tapered lower portion of the first casing and having an intake passage for introducing air tangentially into said first casing below said cylindrical upper portion and said discharge member, and a tapered lower portion depending directly from the bottom edge of the second cylindrical casing having an automatically operated discharge valve at its lower end.

19. A dust separator comprising a casing having an upper cylindrical portion and a lower portion of less cross sectional area than said upper portion and having its lower end flared outwardly, an air discharge member of less diameter than said cylindrical portion extending axially downward into said cylindrical portion and terminating substantially at the lower end thereof, means for introducing air tangentially into the space between said member and the wall of said casing, a chamber extending about said lower portion and in communication therewith, and means for introducing air tangentially into said chamber above said flared portion, said air discharge member constituting the sole means for discharging air from said casing.

20. A dust separator comprising a dust separator chamber, means for introducing dust laden air into one portion of said chamber and for causing the same to rotate in one direction within said chamber, means for introducing air into another portion of said chamber and for causing the same to tend to rotate in a direction counter to that of said first named means for contacting with said dust laden air for separating dust therefrom, a conduit for conducting air from said chamber, and a circular baffle suspended directly from the lower end of said discharge conduit adjacent to and held in spaced relation thereto, and extended substantially transversely to the lower end of said conduit.

21. A dust separator comprising a dust separating chamber having an unobstructed axial opening in its lower end, a single imperforate outlet pipe extending into said chamber and having its inner end arranged axially of said chamber, means for introducing dust laden air into one portion of said chamber and for causing the same to rotate in one direction therein around the inner end of said pipe, and means for introducing other air into said chamber through said axial opening at a pressure not greater than atmospheric and for causing said air to tend to rotate oppositely therein, the inner end of said pipe terminating between said means for introducing air into said chamber.

22. A dust separator comprising a dust separating chamber, means for introducing dust laden air into said chamber and for causing the same to rotate therein, means including a conduit for introducing additional air into said chamber and for causing the same to tend to rotate therein in the opposite direction for contacting with said dust laden air for separating solid particles therefrom, a valve in said conduit for controlling the amount of air passing therethrough, and a single discharge conduit for conducting air from said chamber, the lower end of said last named conduit having a flange extending about the same flared outwardly.

23. A dust separator comprising a casing having an opening in its lower portion, a chamber secured to and surrounding the lower portion of said separator and said opening, the walls of said chamber being spaced from said casing from a point above said opening to its lower extremity for forming a passage, means for introducing dust laden air into the upper portion of said casing and for causing the same to rotate in one direction therein, means for introducing air into said chamber at a point vertically spaced from said opening and for causing the same to rotate in said casing in a direction counter to that of said material laden air and for contacting the same for effecting a separation of material in said air, and a discharge outlet for conducting air and the finer particles of said material from said casing.

24. A dust separator comprising a casing having an axial opening in its lower portion, means including an inlet for introducing material laden air into one portion of said casing and for causing the same to rotate therein in one direction and means for introducing air into said casing through said axial opening including means above the axial opening for causing said air to rotate as it enters said casing in a direction counter to the rotation of said material laden air for cooperating therewith for effecting a separation of the material from said air and an outlet for discharging air from said casing.

25. A dust separator comprising a casing circular in cross section, its lower portion being of less cross-sectional area than its upper portion, said lower portion having an opening therein, a chamber surrounding the lower portion of said casing and enclosing said opening, said chamber having a discharge opening in its lower portion, the side wall of said chamber being attached at its upper end to said casing and having the remaining portion of said wall continuous and spaced from said casing to form a free, unobstructed passage around said casing from the point of attachment thereof to said discharge opening, means for introducing material laden air into said casing and for causing the same to rotate therein in one direction, means for introducing air into said chamber and for causing the same to rotate in said casing in a direction counter to that of said material laden air and a discharge outlet for said casing.

In testimony whereof I affix my signature.

WILLIAM B. PROUTY.